United States Patent [19]
Collins et al.

[11] 4,181,976
[45] Jan. 1, 1980

[54] BIT REVERSING APPARATUS

[75] Inventors: Michael J. Collins, Merrimack; Michael T. S. Ching, Nashua, both of N.H.

[73] Assignee: Raytheon Company, Lexington, Mass.

[21] Appl. No.: 950,204

[22] Filed: Oct. 10, 1978

[51] Int. Cl.$^2$ .................................... H03K 21/10
[52] U.S. Cl. .................... 364/900; 235/92 SH; 364/726
[58] Field of Search ........ 364/726, 736, 900 MS File, 364/200 MS File; 235/92 EV, 92 SH, 92 DP

[56] References Cited

U.S. PATENT DOCUMENTS

| | | | |
|---|---|---|---|
| 3,371,320 | 2/1968 | Lachenmayer | 364/900 |
| 3,673,399 | 6/1972 | Hancke et al. | 364/726 |
| 3,731,284 | 5/1973 | Thies | 364/726 |
| 3,781,822 | 12/1973 | Ahamed | 364/900 |
| 3,810,112 | 5/1974 | Aho et al. | 364/900 |
| 3,866,023 | 2/1975 | Kadakia | 235/92 SH |
| 3,875,391 | 4/1975 | Shapiro et al. | 364/200 |
| 3,942,171 | 3/1976 | Haraszti et al. | 235/92 SH |
| 3,988,601 | 10/1976 | Perry | 364/726 |

*Primary Examiner*—Leo H. Boudreau
*Attorney, Agent, or Firm*—Richard M. Sharkansky; Joseph D. Pannone

[57] ABSTRACT

Apparatus is disclosed for reversing the bit order of a selected portion of a digital word. A first shifter is provided to shift the position of the unselected portion of the digital word to a set of terminals. The digital word, in bit reversed order, is coupled to an adjacent set of terminals. The two sets of terminals are fed to a second shifter which couples to the output thereof the digital word with the selected portion thereof in bit-reversed order. Such apparatus is adapted for use in addressing an FFT processor adapted to operate with different batch sizes to retrieve calculated frequency components in ascending order of frequency.

3 Claims, 6 Drawing Figures

BIT REVERSING APPARATUS

The invention herein described was made in the course of, or under a contract or subcontract thereunder, with the Department of Defense.

BACKGROUND OF THE INVENTION

This invention relates generally to digital circuitry and more particularly to digital circuitry adapted to reverse the order of a selected portion of a digital word.

As is known in the art, it is sometimes necessary to reverse the order of the bits of a digital word. For example, in many Fast Fourier Transformer (FFT) processors it is required that memory addresses in such processors be bit-reversed at various steps in the processing, for example in retrieving the computed frequency components in ascending order of frequency. In applications where the entire address is to be bit-reversed one technique used is to couple the address in bit-reversed order and non-bit reversed order to a selector and selectively coupling either the bit-reversed address or the non-bit reversed address to the output of the selector. Such technique is described in U.S. Pat. No. 3,673,399 issued June 27, 1972.

In many FFT applications the address generator produces a fixed length digital word. However, the FFT processors are adapted to perform FFT processing for a variety of data or batch sizes, say a four-point FFT, an eight-point FFT and a sixteen-point FFT. One such processor is described in U.S. Pat. No. 3,875,391, inventors G. N. Shapiro and H. S. Sobel, issued Apr. 1, 1975 and assigned to the same assignee as the present invention. With such type processors, if it is desired to obtain the computed frequency components in ascending order of frequency, it would be desirable if a different number of bits of the address were reversed depending on the batch size of the FFT. For example, if the address is a six bit digital word $a_5 a_4 a_3 a_2 a_1 a_0$ (where $a_0$ is the least significant bit and $a_5$ is the most significant bit) in one batch size it may be desired to reverse only the three least significant bits to form an address $a_5 a_4 a_0 a_1 a_2$ while for another batch size it may be desired to bit-reverse the five least significant bits to form the address $a_5 a_0 a_1 a_2 a_3 a_4$. It is evident then that using the multiplexer technique described above requires coupling to such multiplexer all possible bit-reversed address combinations required for all possible batch sizes which are to be processed, thereby requiring extensive hardware in generating proper addresses.

SUMMARY OF THE INVENTION

In accordance with the present invention apparatus is provided for reversing the bit order of a selected portion of an m bit digital word. Such apparatus includes: (a) means for producing the m bit digital word in bit-reversed order at a first set of terminals; (b) means coupled to the m bit digital word in non-bit reversed order for coupling the unselected portion of the m bit digital word in non-bit reversed order to a second set of terminals; and (c), means for coupling the portion of the first set of terminals producing the selected portion of the m bit digital word in bit-reversed order and the second set of terminals to a set of m output terminals to produce an output digital word, such output digital word being the m bit digital word with the selected portion thereof in bit-reversed order and the unselected portion in non-bit reversed order.

BRIEF DESCRIPTION OF THE DRAWINGS

The invention will be more fully understood from the following more detailed description taken together in conjunction with the accompanying drawings in which.

DESCRIPTION OF THE PREFERRED EMBODIMENTS

Figure 1:
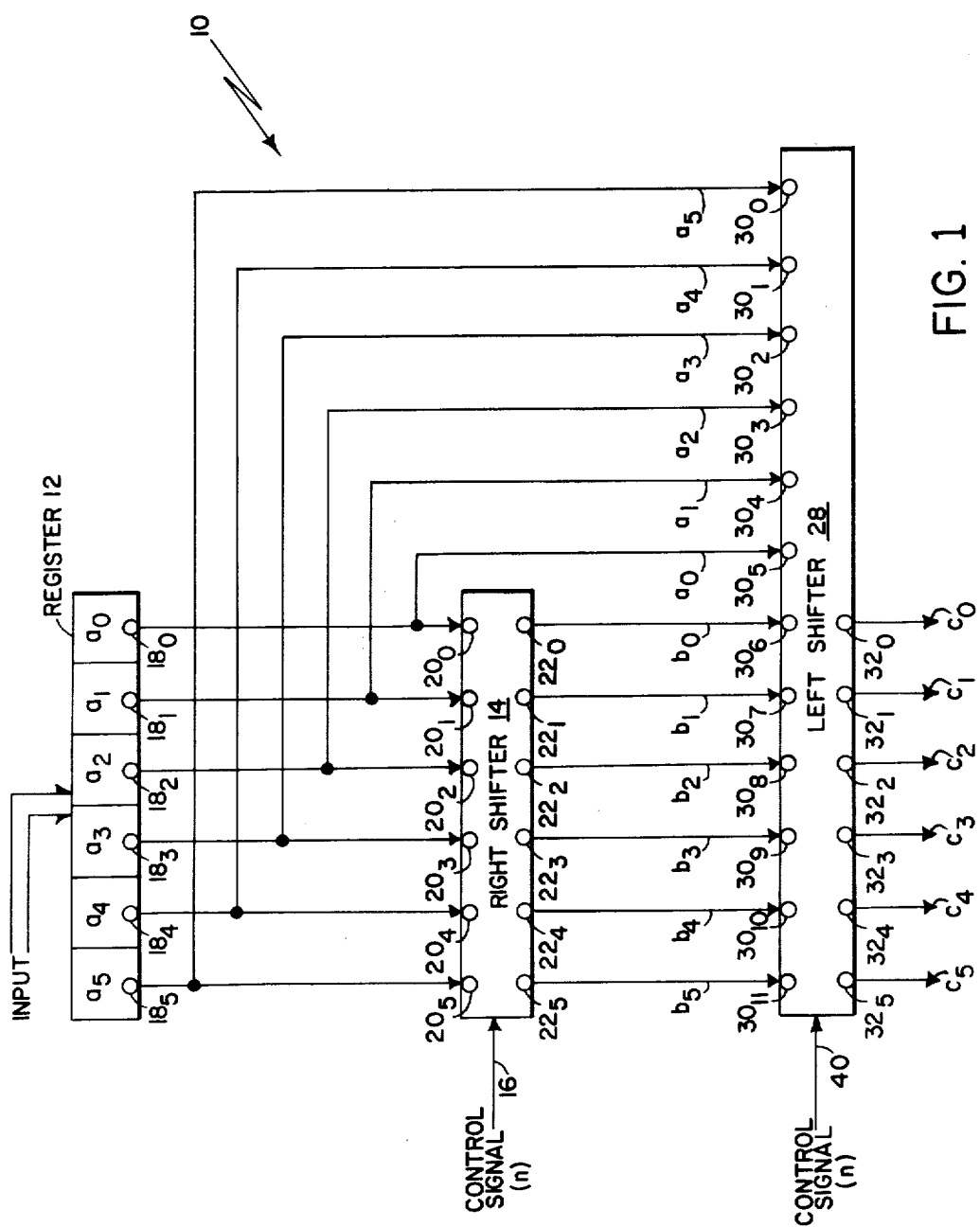
FIG. 1 is a block diagram of bit-reversing apparatus according to the invention.

Referring now to FIG. 1, bit-reversing apparatus 10 is shown adapted to bit reverse a selected portion of the n least significant bits of an m bit digital word, here a six bit digital word $a_5 a_4 a_3 a_2 a_1 a_0$, where $a_5$ is the most significant bit and $a_0$ is the least significant bit. Such apparatus 10 includes a conventional register 12 for storing the six bit digital word. Thus, the six bits appear at output terminals $18_5$-$18_0$ of such register 12, respectively, as indicated. A first shifter 14 is included. Such shifter has m input terminals, here terminals $20_5$-$20_0$, coupled respectively to output terminals $18_5$-$18_0$, as shown. Output terminals $22_5$-$22_0$ of such shifter 14 are provided, as shown. Shifter 14 is of any conventional design and produces a second m bit digital word $b_5 b_4 b_3 b_2 b_1 b_0$ at output terminals $22_5$-$22_0$, respectively, (where $b_5$ is the most significant bit appearing at output terminal $22_5$) and $b_0$ is the least significant bit (appearing at output $22_0$). The second m bit digital word has as its $(m-n)$ (here $(6-n)$) least significant bits the $(m-n)$ most significant bits of the digital word stored in the register 12. That is, the first shifter 14, in response to a control signal representative of the number of bits n to be bit reversed and fed to such shifter 14 via line 16, produces a second digital word having as a portion thereof the unselected portion of the digital word stored in the register shifted n bit positions, here to the right. An example of a typical shifter is a Fairchild F100158 described in ECL Data Book published by Fairchild Camera & Instrument Corp., 1977, pgs. 10-48-10-53. The following truth table describes the operation of the shifter 14:

| n | $b_5$ | $b_4$ | $b_3$ | $b_2$ | 24 $b_1$ | $b_0$ |
|---|---|---|---|---|---|---|
| 0 | $a_5$ | $a_4$ | $a_3$ | $a_2$ | $a_1$ | $a_0$ |
| $(1)_{10}$ | 0 | $a_5$ | $a_4$ | $a_3$ | $a_2$ | $a_1$ |
| $(2)_{10}$ | 0 | 0 | $a_5$ | $a_4$ | $a_3$ | $a_2$ |
| $(3)_{10}$ | 0 | 0 | 0 | $a_5$ | $a_4$ | $a_3$ |
| $(4)_{10}$ | 0 | 0 | 0 | 0 | $a_5$ | $a_4$ |
| $(5)_{10}$ | 0 | 0 | 0 | 0 | 0 | $a_5$ |
| $(6)_{10}$ | 0 | 0 | 0 | 0 | 0 | 0 |

Figure 2:
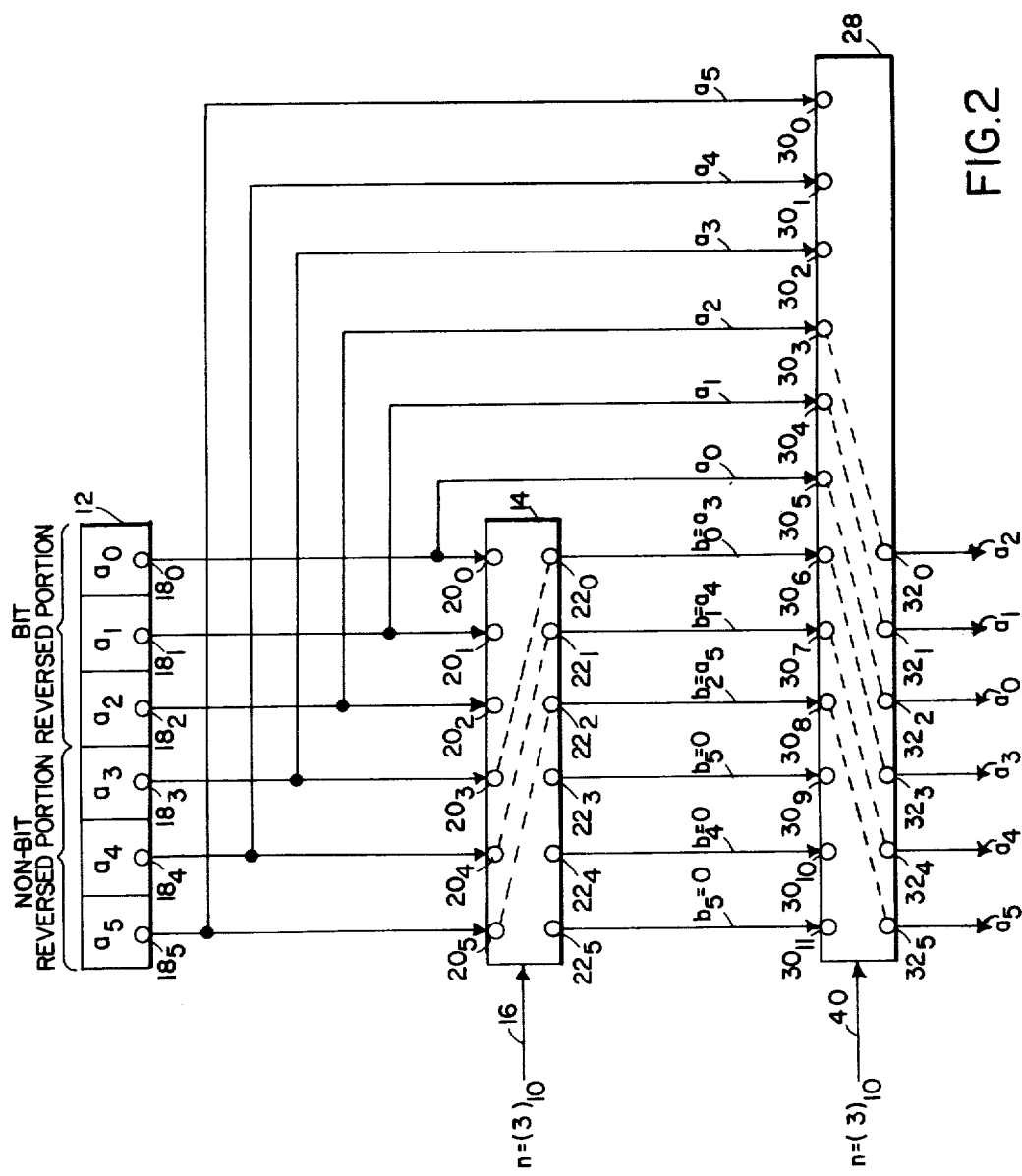
FIGS. 2 and 3 are block diagrams useful in understanding the operation of the bit-reversing apparatus shown in FIG. 1.
Figure 3:
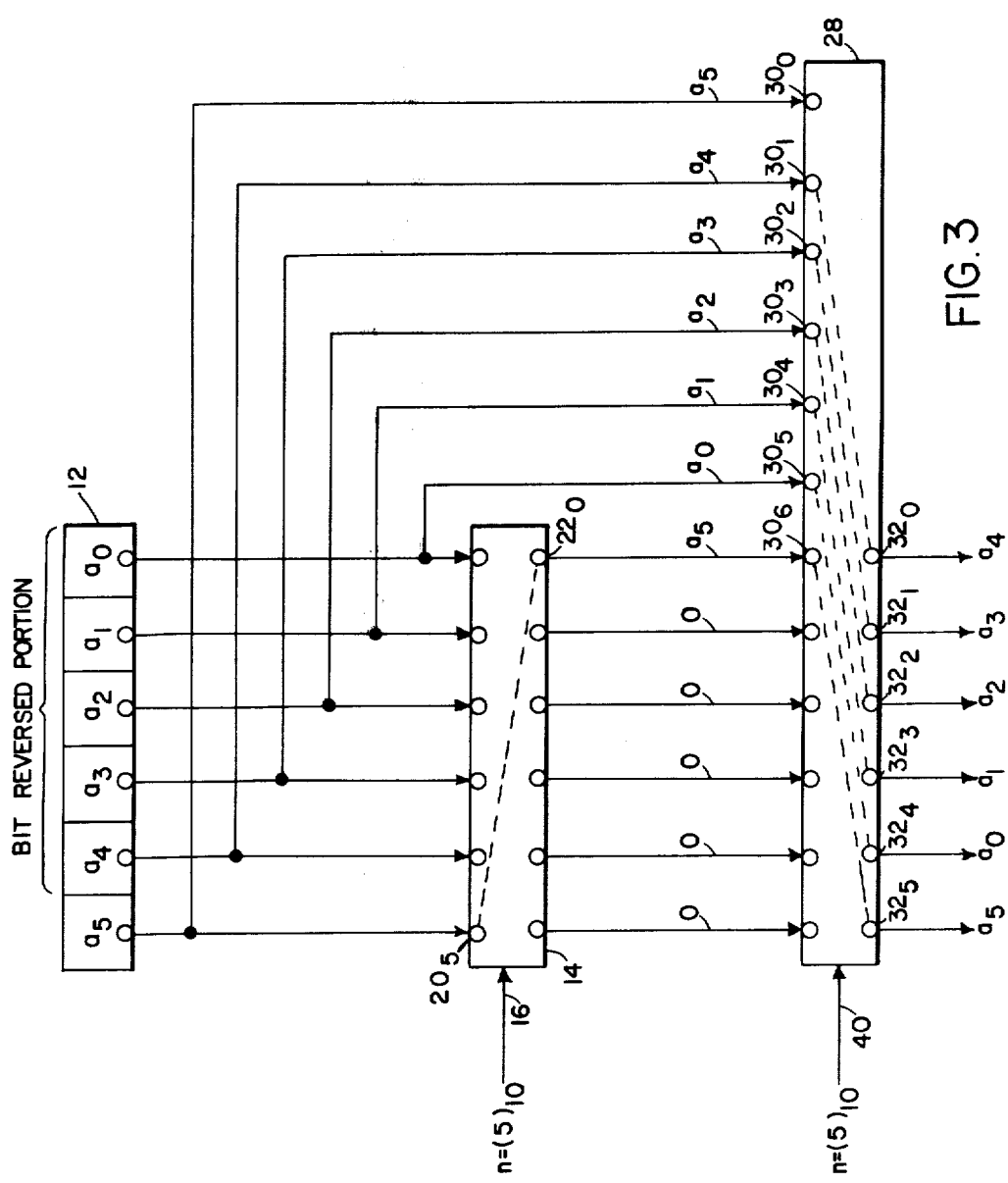

Referring also to FIG. 2 and considering as an example the case where $n=(3)_{10}$, in response to a control signal representative of $n=(3)_{10}$ input terminal $20_5$ becomes connected to output terminal $22_2$; input terminal $20_4$ becomes connected to output terminal $22_1$; and input terminal $20_3$ becomes connected to output terminal $22_6$ as indicated by the dotted lines in FIG. 2. Hence, the second digital word $b_5 b_4 b_3 b_2 b_1 b_0$ is, in this example, 0 0 0 $a_5 a_4 a_3$. Referring now also to FIG. 3, a second example is shown here where $n=(5)_{10}$. In response to a control signal on line 16 representative of $(5)_{10}$ input terminal $20_5$ becomes connected to output terminal $22_0$ as indicated by the dotted line, and, hence, the second digital word $b_5 b_4 b_3 b_2 b_1 b_0$ is, in this second example, 0 0 0 0 0 $b_5$.

Referring again to FIG. 1, a second shift register 28 is included, such shifter 28 having input terminals $30_1$–$30_0$, as shown. The input terminals $30_{11}$–$30_6$ are connected to output terminals $22_5$–$22_0$, respectively, as shown. As noted, the second digital word $b_5 \ldots b_0$ is connected in non-bit reversed order to input terminals $30_{11}$–$30_6$, respectively. Input terminals $30_5$–$30_0$ are connected to output terminals $18_0$–$18_5$, respectively. It is noted, therefore, that the digital word stored in register 12, i.e., $a_5 \ldots a_0$, is coupled to input terminals $30_5$–$30_0$, respectively, in bit-reversed order, ie., $a_0 \ldots a_5$. The second shifter 28 has output terminals $32_5$–$32_0$ and produces an output digital word $c_5 \ldots c_0$, such bits appearing on terminals $32_5$–$32_0$, respectively, as indicated, where $c_5$ is the most significant bit and $c_0$ is the least significant bit. Here, however, the bits fed to input terminals $30_{11}$–$30_0$, respectively, are shifted to the left n places in response to a control signal representative of n fed to shifter 28 via line 40. The following truth table describes the operation of the second shifter 28:

| n | $C_5$ | $C_4$ | $C_3$ | $C_2$ | $C_1$ | $C_0$ |
|---|---|---|---|---|---|---|
| 0 | $b_5$ | $b_4$ | $b_3$ | $b_2$ | $b_1$ | $b_0$ |
| $(1)_{10}$ | $b_4$ | $b_3$ | $b_2$ | $b_1$ | $b_0$ | $a_0$ |
| $(2)_{10}$ | $b_3$ | $b_2$ | $b_1$ | $b_0$ | $a_0$ | $a_1$ |
| $(3)_{10}$ | $b_2$ | $b_1$ | $b_0$ | $a_0$ | $a_1$ | $a_2$ |
| $(4)_{10}$ | $b_1$ | $b_0$ | $a_0$ | $a_1$ | $a_2$ | $a_3$ |
| $(5)_{10}$ | $b_0$ | $a_0$ | $a_1$ | $a_2$ | $a_3$ | $a_4$ |
| $(6)_{10}$ | $a_0$ | $a_1$ | $a_2$ | $a_3$ | $a_4$ | $a_5$ |

Referring now also to FIG. 2 and considering again the example where $n=(3)_{10}$ in response to a control signal on line 40 representative of $(3)_{10}$, input terminal $30_8$ becomes connected to output terminal $32_5$; input terminal $30_7$ becomes connected to output terminal $32_4$; input terminal $30_6$ becomes connected to output terminal $32_3$; input terminal $30_5$ becomes connected to output terminal $32_2$; input terminal $30_4$ becomes connected to output terminal $32_1$; and input terminal $30_3$ becomes connected to output terminal $32_0$, as indicated by the dotted lines. Hence, the digital word appearing at output terminals $32_5$–$32_0$ is $a_5 a_4 a_3 a_0 a_1 a_2$, that is the digital word stored in register 12 with the three least significant bits in reverse order.

Referring now also to FIG. 3 and again considering the example where $n=(5)_{10}$ input terminals $30_6$–$30_1$ become connected to output terminals $32_5$–$32_0$, respectively, to produce at such output terminals the digital word $a_5 a_0 a_1 a_2 a_3 a_4$, that is, the digital word stored in register 12 here with the five least significant bits in bit reverse order.

In summary then, the second shifter 28 is coupled to the digital word stored in register 12 in bit-reversed order and to the second digital word produced at the output of the first shifter 14. The second shifter, in response to a control signal on line 40 representative of the number of bits n to be reversed, produces an output digital word having the previously shifted (m−n) here (6−n) most significant bits of the digital word stored in register 12 and the n least significant bits of such stored digital word in bit-reversed order shifted, here to the left, n bit positions.

Figure 4:
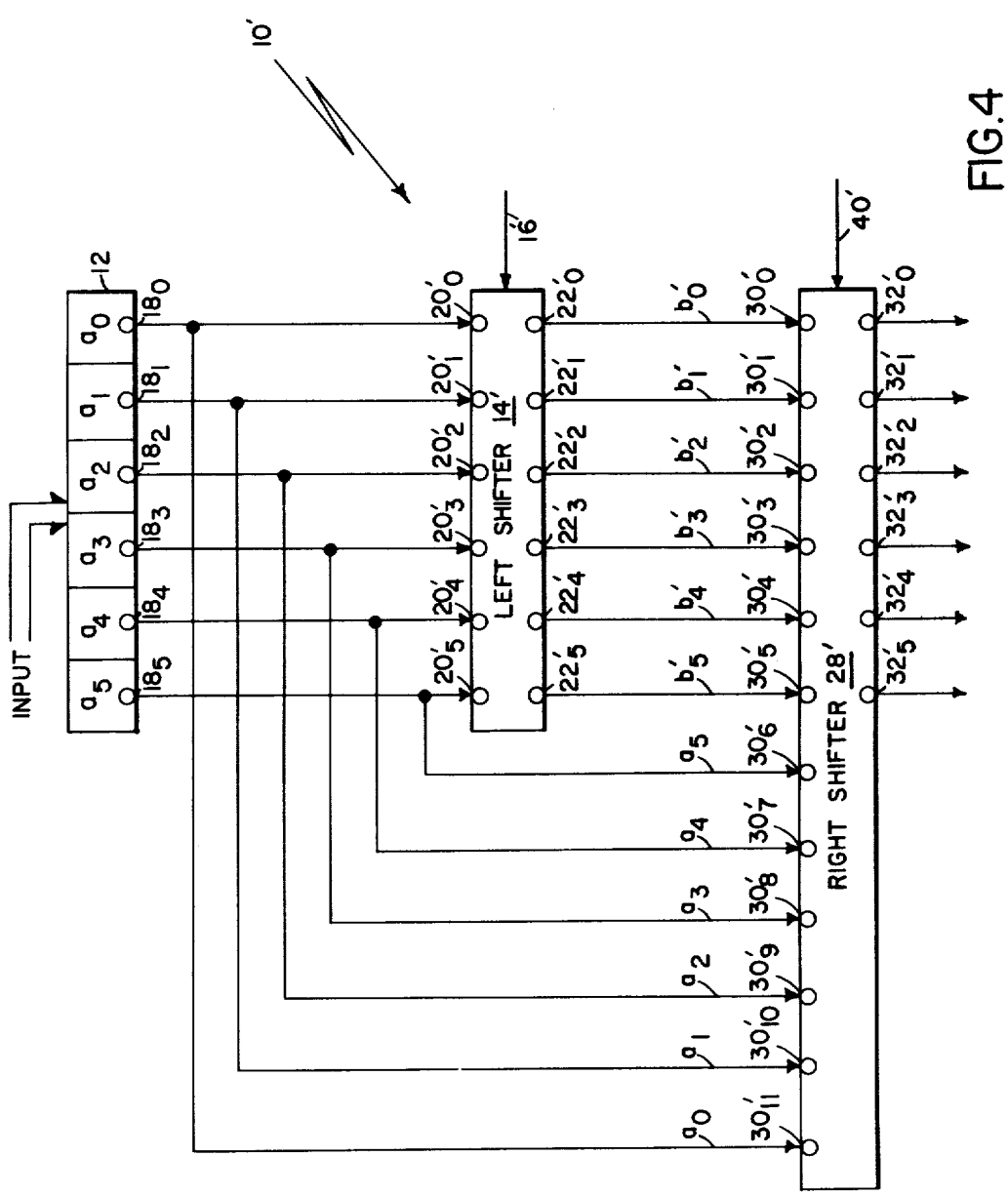
FIG. 4 is a block diagram of an alternative embodiment of a bit-reversing apparatus.
Figure 5:
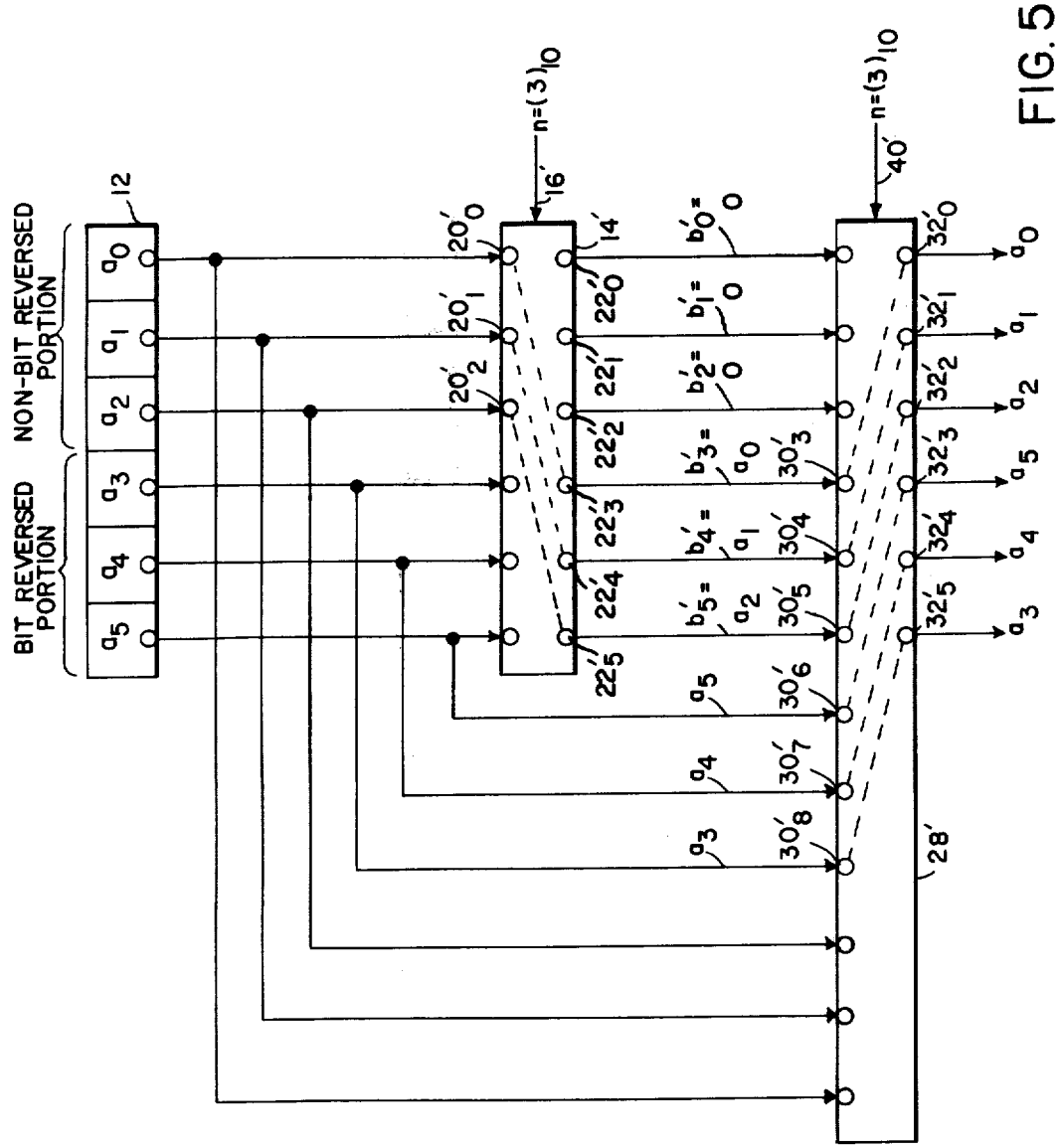
FIG. 5 is a block diagram useful in understanding the bit-reversing apparatus shown in FIG. 4.

Referring now to FIG. 4, apparatus 10' is shown adapted to bit-reverse a selected portion of the n most significant bits of an m bit digital word, here a six bit digital word $a_5 a_4 a_3 a_2 a_1 a_0$, where $a_5$ is the most significant bit and $a_0$ is the least significant bit. Here shifter 14' is of conventional design and is similar to shifter 14 (FIG. 1) except that the digital word fed to input terminals $20_5'$–$20_0'$ thereof, here $a_5$–$a_0$, respectively, is shifted to the left n places in response to the control signal representative of n fed to such shifter 14' via line 16'. The shifter 14' produces a digital word $b_5'$–$b_0'$ at output terminals $22_5$–$22_0$, respectively, where $b_5'$ is the most significant bit and $b_0'$ is the least significant bit. Thus, referring briefly to FIG. 5, for example, where $n=(3)_{10}$, in response to the control signal $(3)_{10}$ on line 16, input terminals $20_2'$–$22_0'$ become connected to output terminals $22_5'$–$22_3'$ as indicated by the dotted lines so that the second digital word $b_5' \ldots b_0'$, produced at terminals $22_5'$–$22_0'$, respectively, is here $a_2 a_1 a_0$ 0 0 0 .

Referring again to FIG. 4, a second selector 28' is provided, input terminals $30_{11}'$–$30_6'$ being connected to the digital word stored in register 12 in bit-reversed order (i.e., $a_0$–$a_5$) and terminals $30_5'$–$30_0'$ are connected to the second digital word in non-bit reversed order (i.e., $b_5'$–$b_0'$). Here shift 28' shifts the data fed thereto to the left n bit positions in response to a control signal on line 40'. That is, referring briefly also to FIG. 5 and considering again the example where $n=(3)_{10}$, input terminals $30_8'$–$30_3'$ become connected to output terminals $32_5'$–$32_0'$ to produce at the output terminal $a_3 a_4 a_5 a_2 a_1 a_0$, respectively, that is, the digital word stored in register 12 with the three most significant bits in bit-reverse order.

Figure 6:
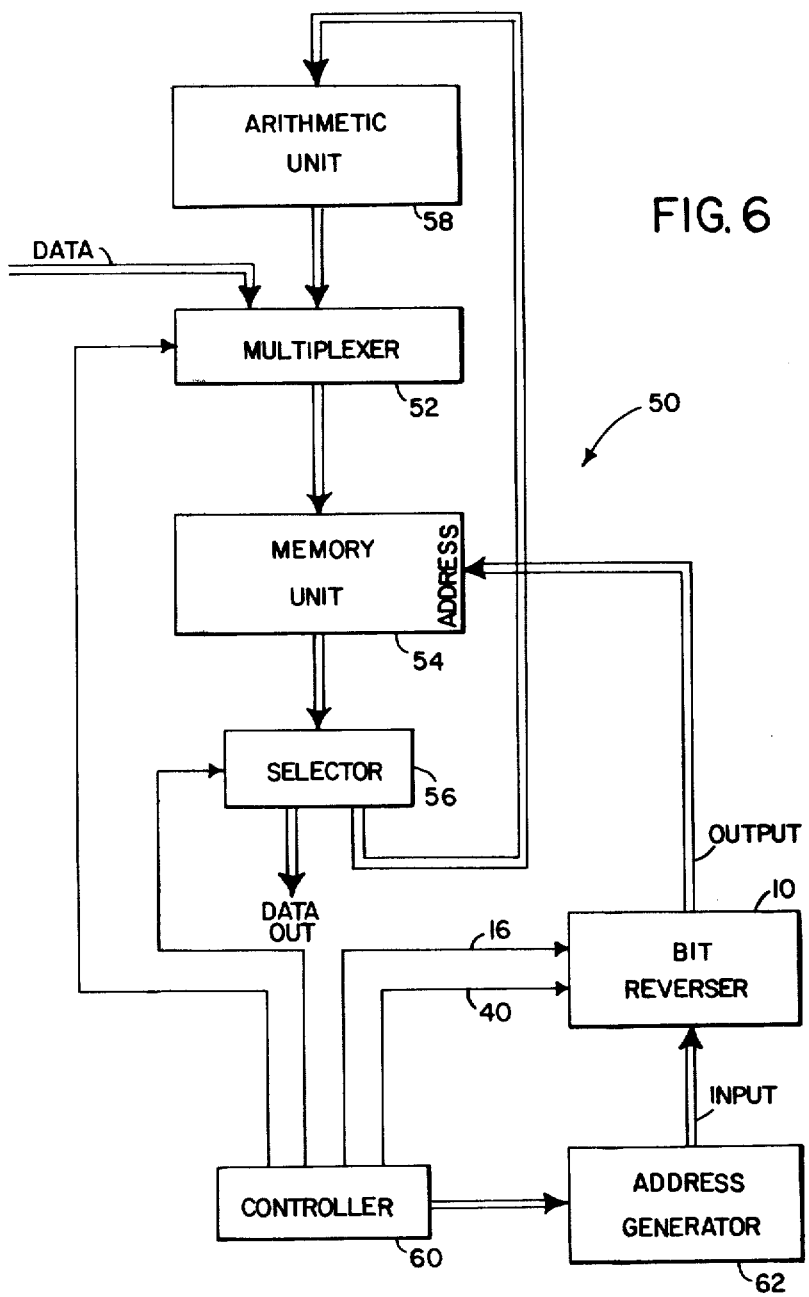
FIG. 6 is a block diagram of an FFT processor including the bit-reversing apparatus shown in FIG. 1.

Referring now to FIG. 6 an FFT processor 50 is shown. Here N digital words are fed via the data bus through multiplexer 52 to a memory unit 54 at addresses supplied to the address terminal of such memory unit 54. Once such N digital words are stored they are fed through selector 56 to an arithmetic unit 58 for processing. The processed data recycles between the arithmetic unit 58 and the memory unit 54 in a well known manner, as described in the above-referenced U.S. Pat. No. 3,875,391, until the desired FFT process is complete. As is known, in order to retrieve the N computed frequency components in ascending order of frequency from the memory unit 54 the non-bit reversed addresses are, as during the computation process, generated by the controller and address generator 62. While during the computation process the addresses supplied by the address generator 62 were not bit-reversed (i.e. $n=0$), here it is desired to bit-reverse $n=(\log_2 N)$ bits of the addresses produced by the address generator 62.

The addresses produced by the address generator 62 are thus fed to the input of the "bit-reverser" or bit-reversing apparatus 10 as shown. The controller 60 produces control signals $n=\log_2 N$ on lines 16, 40. Hence the address supplied to the address terminals of the memory unit 54 are the addresses produced by the address generator 62 with the n least significant bits "bit-reversed". During readout the frequency components are thus retrieved in ascending order of frequency and pass through the selector 56 to the DATA OUT bus, as shown.

Having described preferred embodiments of this invention, it is now evident that other embodiments incorporating the concepts may be used. It is felt, therefore, that this invention should not be restricted to the disclosed embodiments, but rather should be limited only by the spirit and scope of the appended claims.

What is claimed is:

1. Apparatus for reversing the order of a selected portion of an m bit digital word, comprising:
   (a) means for producing the m bit digital word in bit-reversed order at a first set of terminals;
   (b) means coupled to the m bit digital word in non-bit reversed order for coupling the unselected portion of the m bit digital word in non-bit reversed order to a second set of terminals; and
   (c) shifter means for coupling the portion of the first set of terminals and the second set of terminals to a set of m output terminals producing an output digital word, such output digital word being the m bit digital word with the selected portion thereof in bit-reversed order and the unselected portion in non-bit reversed order.

2. Apparatus for reversing the order of a selected portion of n bits of an m bit digital word, comprising:
   (a) a first shifter, having m input terminals fed by the m bit digital word and m output terminals, for shifting the position of the (m−n) unselected bits of the digital word from the most/least significant bit portion to the least/most significant bit portion;
   (b) a second shifter having 2m input terminals and 2m output terminals, m adjacent ones of such input terminals being connected to the m output terminals of the first shifter and the remaining m adjacent ones of such input terminals being connected to the m bit digital word in bit-reversed order, for producing at the m output terminals thereof the m bit digital word with the selected portion of n bits thereof in bit-reversed order.

3. The apparatus recited in claim 2 wherein the first shifter includes means for shifting the digital word fed thereto to the output terminals thereof in a first direction and the second shifter includes means for shifting the digital word fed thereto to output terminals thereof in an opposite direction.

* * * * *